United States Patent [19]

Peters et al.

[11] Patent Number: 5,643,611

[45] Date of Patent: Jul. 1, 1997

[54] APPARATUS FOR CALIBRATING AND SUPPORTING AN EXTRUDED TUBULAR FILM BLOWN UP INTO A FILM BUBBLE

[75] Inventors: Rudolf Peters, Lengerich; Wilfried Howe, Tecklenburg, both of Germany

[73] Assignee: Windmoller & Holscher, Lengerich/Westf., Germany

[21] Appl. No.: 359,385

[22] Filed: Dec. 20, 1994

[30] Foreign Application Priority Data

Jan. 24, 1994 [DE] Germany ............... 44 01 933.5

[51] Int. Cl.$^6$ ............................................. B29C 49/42
[52] U.S. Cl. ............................... 425/72.1; 425/326.1
[58] Field of Search ................... 425/72.1, 326.1, 425/387.1

[56] References Cited

U.S. PATENT DOCUMENTS

| | | | |
|---|---|---|---|
| 3,930,781 | 1/1976 | Upmeier | 425/72.1 |
| 3,980,418 | 9/1976 | Schott, Jr. | 425/72.1 |
| 4,388,061 | 6/1983 | Bebok | 425/326.1 |
| 4,479,766 | 10/1984 | Planeta | 425/326.1 |
| 4,650,407 | 3/1987 | Taguchi | 425/72.1 |
| 4,728,277 | 3/1988 | Planeta | 425/326.1 |
| 4,793,790 | 12/1988 | Reinhold | 425/387.1 |
| 5,441,395 | 8/1995 | Planeta | 425/326.1 |

FOREIGN PATENT DOCUMENTS

| | | |
|---|---|---|
| 7141837 | 4/1972 | Germany . |
| 3117806 | 11/1982 | Germany . |

*Primary Examiner*—Thomas R. Weber
*Attorney, Agent, or Firm*—Keck, Mahin & Cate

[57] ABSTRACT

An apparatus for calibrating and supporting an extruded film blown up into a film bubble made of a synthetic melt in an inflation extrusion installation consisting of supporting means driven by link rods whose inner ends are articulated in the median zone of each supporting means, and whose outer ends are articulated to brackets, which form parts of frames that carry spindle nuts at at least two points, and axially parallel screw spindles which are mounted on the basket-shaped frame and are provided with drive means, and have thread sections provided with threads of opposite hand screwed into said spindle nuts; that at a distance from one of said link rods, there is arranged an additional link rod parallel thereto and whose respective ends are articulated to a respective said supporting bar and to a said bracket.

2 Claims, 2 Drawing Sheets

APPARATUS FOR CALIBRATING AND SUPPORTING AN EXTRUDED TUBULAR FILM BLOWN UP INTO A FILM BUBBLE

FIELD OF THE INVENTION

The invention concerns an apparatus for calibrating and supporting an extruded film blown up into a film bubble made of a synthetic melt in an inflation extrusion installation.

PRIOR ART

In an apparatus known from the DE-A-3117806 the levers for actuating movement of the bubble supports consist of two crossed bars, forming two scissor-type adjustment bars, with the upper ends of the crossed bars articulated on the one hand to a bush fixed to the frame and on the other hand to the upper end of each supporting bar. In that arrangement the outer bottom end of one of the crossed bars is mounted on a spindle nut that is adjustable by a spindle drive, and the inner bottom end of the other crossed bar is mounted on a bush that is displaceable on the supporting bar. This known manner of a radial adjustment of the supporting bars carrying the supporting segments has the result that the bottom free and unsupported portions of the supporting bar increase in length with their increasing inward adjustment, that is to say, when they are set for tubular film bubbles with smaller diameters. Because of their elasticity and the coupled masses, the free ends of the supporting bars carrying the supporting segments tend to vibrate as the lengths of the free unsupported ends increase. Since the adjustment screw spindles on which the spindle nuts pivot the crossed bars, are also only mounted on one side this tendency to vibrate is increased still further.

OBJECT OF THE INVENTION

It is, therefore, the object of the invention to create an apparatus of the type referred to in the opening paragraph above, but wherein even with an adjustment of the supporting segments to different diameters of the film bubble, vibrations of the supporting bar which carry the supporting segments are avoided, or at least reduced to an admissible level.

SUMMARY OF THE INVENTION

In accordance with the invention, we provide an apparatus for calibrating and supporting an extruded film inflated into a film bubble made of a synthetic melt in an inflation extrusion installation, consisting of supporting means that may be applied approximately tangentially to the film bubble and which define a polygon approximating to a circle, said supporting means including bars which are disposed parallel to the axis of the tubular film and are articulated by respective levers provided with adjustment drives to an outer basket-shaped frame, in such a way that they are each displaceable in their planes in the radial direction to the same extent; wherein the levers consist of link rods whose inner ends are articulated in the median zone of each supporting bar, and whose outer ends are articulated to brackets, which form parts of frames that carry spindle nuts at at least two points; wherein axially parallel screw spindles are mounted on the basket-shaped frame and are provided with drive means, and have thread sections provided with threads of opposite hand screwed into said spindle nuts; and wherein at a distance from one of said link rods, there is arranged an additional link rod parallel thereto and whose respective ends are articulated to a respective said supporting bar and to a said bracket. The link rods carrying the supporting bars always act on the median zone of the supporting bars irrespective of their radial adjustments at the time. Because of this, it is possible to articulate each supporting bar to both link rods in such a way that inadmissible vibrations are precluded. The vibration behavior of the supporting bars cannot be altered as a result of an adjustment to different diameters of the film bubble, since the articulation point of the two link rods is not altered by this adjustment.

The two link rods carrying each supporting bar are connected thereto by a common articulation pin. At a distance from one of the link rods, provision is additionally made for a further link rod disposed parallel thereto, whose ends are articulated to the same supporting bar and bracket as are the ends of said one link rod. This additional link rod expediently forms a link rod parallelogram with the said one link rod. This additional link rod does not have the function of carrying the respective supporting bar, but they merely serve to stabilize the supporting bars and to guide them in parallel.

Expediently, the screw spindles are mounted on the basket-shaped frame at their upper and lower ends and in their median zone between their sections which are provided with threads of opposite hand, so that possible vibrations of the screw spindles are suppressed.

Preferably the screw spindles are mounted on axially parallel supports of the basket-shaped frame, which form the corners of the basket-shaped frame that is polygonal in a plan view.

The drive means of the screw spindles may be chain wheels fitted on the journals of the screw spindles which project from a frame profile of the basket-shaped frame, and over which a common drive chain runs.

Suitably neighbouring supporting link rods or segments mounted on the supporting bars are respectively arranged offset to each other in vertical or axial planes, so that they can perform large adjustment movements without any mutual impediment.

BRIEF DESCRIPTION OF THE DRAWINGS

By way of example one embodiment of the invention will be explained in greater detail below with reference to the accompanying drawings, in which.

DETAILED DESCRIPTION OF THE PREFERRED EMBODIMENT

Figure 1:
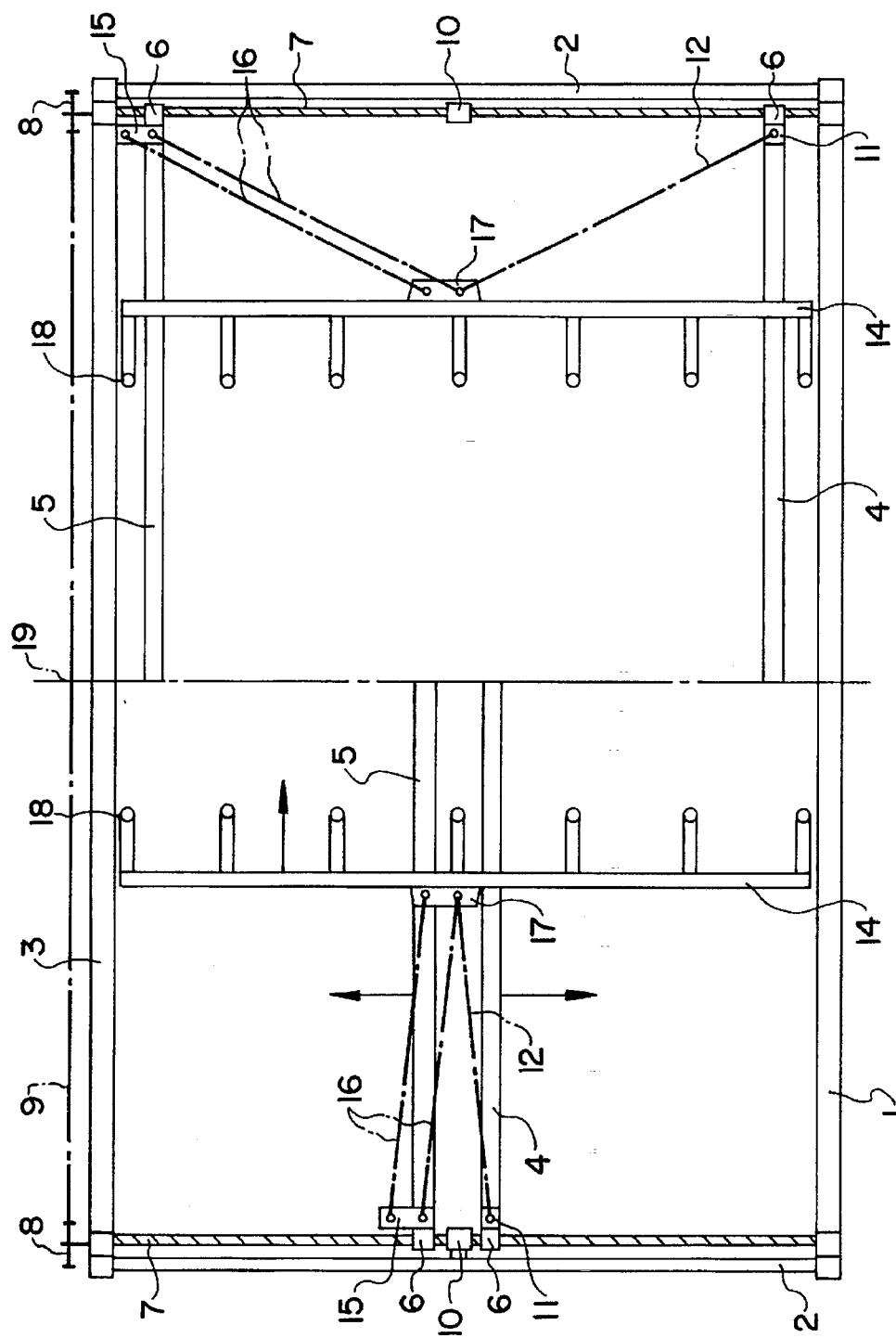
FIG. 1 shows a calibrating basket in a side view.

A lower octagonal frame 1 is rigidly connected, by means of eight vertical columns 2, to an upper frame 3 that is also octagonal. Within the defining lines of these frames 1 and 3 there are two movable frames 4 and 5, arranged one above the other, which also have an octagonal shape. For the purpose of adjusting these frames 4 and 5, spindle nuts 6, which surround screw spindles 7, are joined to the frames at several corners, at least two, and preferably four as in this embodiment. The screw spindles 7 are supported rotatably both in the bottom frame 1 and in the top frame 3, and a chain wheel 8 is connected to the upper end of each screw spindle 7, with all chain wheels connected to one another by means of a common drive chain 9. To avoid vibrations in the screw spindles 7, the four screw spindles are centrally rigidly connected, by means of holders 10, to the columns 2 that adjoin them. The screw spindles 7 have to each side of their middle regions threads of opposite hands so that, when a chain wheel 8 is actuated, the frames 4 and 5 are moved towards each other or away from each other.

In the zone of each of the eight corner points the frame 4 has a respective bracket 11 which is connected approximately centrally to the associated vertical holder 14 by means of a link rod 12 and bracket 17. Just like the frame 4, the upper movable frame 5 also has a respective bracket 15 at each of its eight corner points, each bracket 15 being connected to the corresponding bracket 17 of the holder 14 by means of twin link rods 16. The vertical holders 14 carry the actual supporting segments 18 which have assumed their inner position in the left-hand half of FIG. 1 and their outer position in the right-hand half of FIG. 1.

The median longitudinal extrusion axis is designated 19.

FIG. 1 clearly shows that one link rod 12 each and the adjoining ones of the twin link rods 16 are connected at a common point to the bracket 17. Because of this arrangement, any flexural forces are effectively prevented from acting on the vertical holders 14. The other link rod of the twin link rods 16, i.e. the one which is more remote from the adjoining link rod 12, merely acts as a parallelism guide for a holder 14. It does not, however, transmit any forces.

Figure 2:
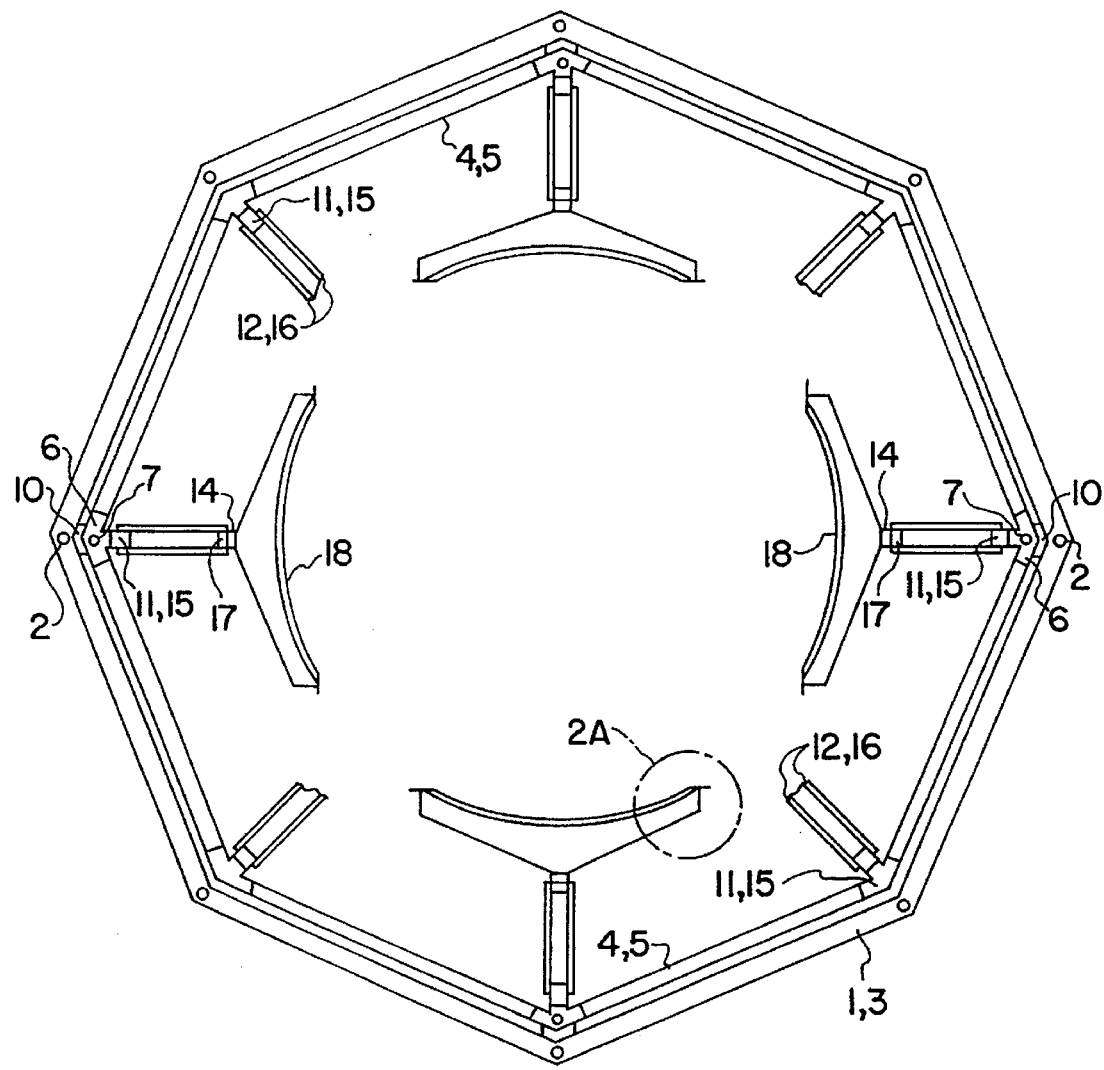
FIG. 2 shows a top view of the calibrating basket according to FIG. 1.
Figure 3:
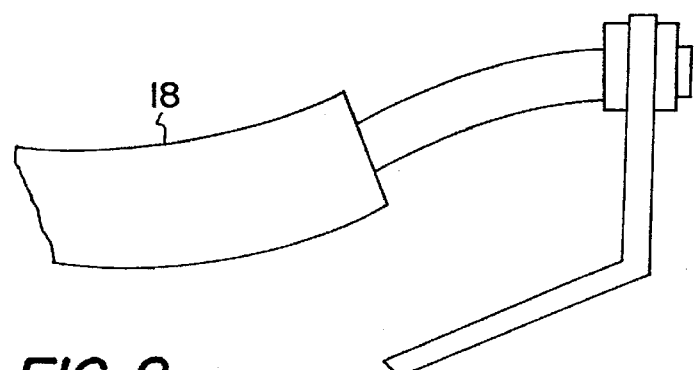
FIG. 3 shows, in an enlarged representation, the part of the calibrating basket encircled in FIG. 2.

For the sake of better clarity, only four sets of supporting segments have been represented in FIG. 2. Other supporting bars 14, on which supporting segments are mounted, will also be carried by these link rods 12, 16 which are shown only in a sectioned representation. The non-illustrated intervening supporting bars 14 will however be in radial planes which are, however, arranged offset to the sets of the supporting segments 18 shown, such that the illustrated supports 18 and the non-illustrated segments do not impede each other in their adjustment movements.

We claim:

1. An apparatus for calibrating and supporting an extruded film inflated into a film bubble made of a synthetic melt in an inflation extrusion installation, comprising supporting means that may be applied approximately tangentially to the film bubble and which define a polygon approximating to a circle, said supporting means including supporting bars which are disposed parallel to the axis of the tubular film and are articulated by respective levers provided with adjustment drives to an outer basket-shaped frame, in such a way that said supporting bars are each displaceable in their planes in a radial direction to the same extent, the improvement wherein:

(a) the levers comprise link rods having inner ends that are articulated in the median zone of each supporting bar, and whose outer ends are articulated to brackets, which form parts of frames that carry spindle nuts at least two points;

(b) axially parallel screw spindles are mounted on the basket-shaped frame and are provided with drive means, and have thread sections provided with threads of opposite hand screwed into said spindle nuts; and (c) at a distance from one of said link rods, an additional link rod is disposed parallel thereto and whose respective ends are articulated to a respective said supporting bar and to a said bracket;

wherein the upper link rod forms, together with the additional link rod, a link rod parallelogram;

the screw spindles are mounted on the basket-shaped frame at their upper and lower ends and in their median zones between their sections that are provided with threads running in opposite directions;

the screw spindles are mounted on axially parallel supports of the basket-shaped frame which supports the screw spindles from the part of the basket-shaped frame that is polygonal in a plan view;

said drive means of the screw spindles are chain wheels fitted on journals of the screw spindles which project from a frame profile of the basket-shaped frame and over which there runs a common drive-pulling means; and neighbouring supporting link rods or supporting segments mounted on the supporting bars are respectively arranged offset to each other in vertical or axial planes.

2. An apparatus according to claim 1, wherein said polygon-defining supporting means comprises segments with curved sides.

* * * * *